Sept. 16, 1969 V. M. PRITCHARD ET AL 3,466,794
SELECTIVE FOWL CALLER
Filed Aug. 22, 1967
Fig. 1
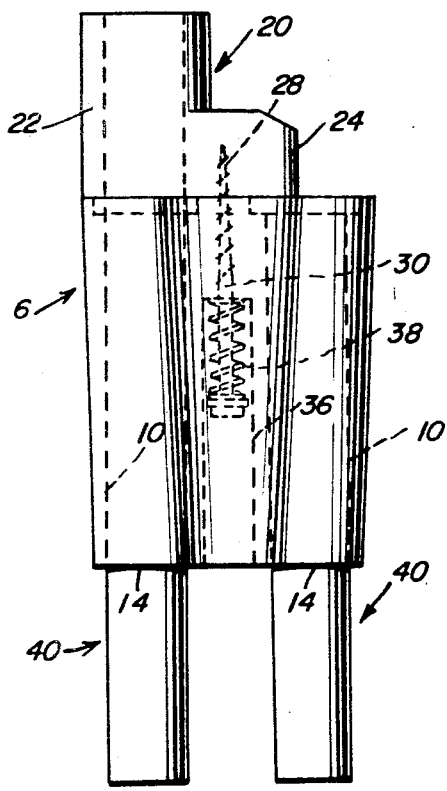
Fig. 3
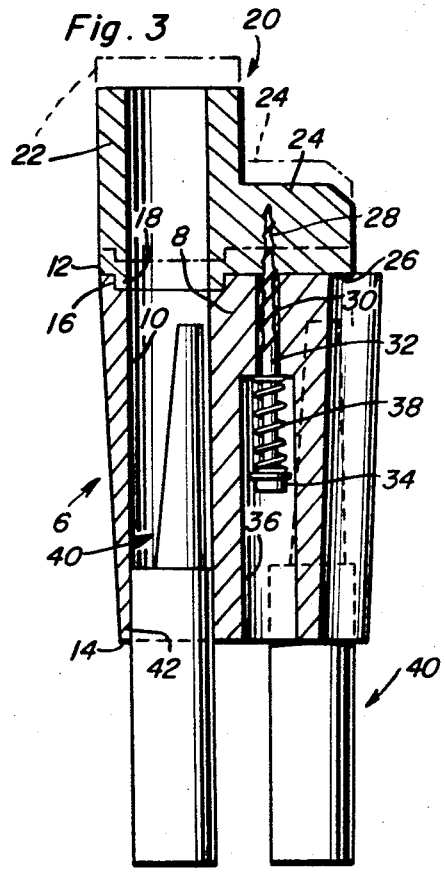
Fig. 2
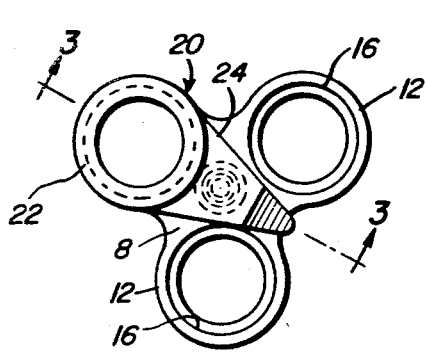
Fig. 4
Vernon M. Pritchard
Marvin L. McBroom
INVENTORS

United States Patent Office 3,466,794
Patented Sept. 16, 1969

3,466,794
SELECTIVE FOWL CALLER
Vernon M. Pritchard, 201 Broadmoor Ave., Houma, La. 70360, and Marvin L. McBroom, Box 201, Des Allemands, La. 70030
Filed Aug. 22, 1967, Ser. No. 662,498
Int. Cl. A63h 5/00, 33/00
U.S. Cl. 46—177         9 Claims

ABSTRACT OF THE DISCLOSURE

This caller comprises a body capable of being held in one hand. Two or more parallel passages serve to hold reed-equipped sound emitting callers. A rotary mouthpiece is selectively registrable with inward ends of the passages. The user can insert and use optional callers for birds, ducks, fowl generally speaking, and animals at will.

---

This invention relates to sound emitting animal, fowl and bird calls or callers wherein a flow of air through an air confining and directing passage or column acts on and vibrates a reed-equipped sounding device which is lodged or otherwise arranged in the passage and has to do with an improved caller provided with two or more passages each for placement therein of a predetermined type caller, and a single mouthpiece which is operatively mounted and can be communicatively registered with a selected passage to produce the call desired by the user.

Briefly the caller herein disclosed is characterized by a portable unit designated as a body. This body, which may be made from wood, suitable plastic materials or even non-corrodible metals is designed so that it is adapted to be grasped and held in one hand of the user in a now generally well-known manner of use. This body is unique in that it is provided with a plurality of separate open-ended barrel-like components each defining a separate open-ended passage. These passages have inner and outer open ends. Each passage provides an individual air column and the outer end portion serves to accommodate an insertable and removable friction-retained distinctively pitched air responsive sounding device which may produce the call of a turkey, duck, bird or the like. A selectively usable mouthpiece is cooperably alignable with an inner end of a selected passage in a manner to direct a flowing column of air to and for operating the sounding device. Means is operatively and adjustably provided for mounting the mouthpiece on the cooperating inner end portion for coaction with the passage and sounding device which the user chooses to employ.

In carrying out the principles of the invention the body can be made up of two or more side by side open-ended barrels with an intervening web or hub portion joining the same in cooperative relation with the respective inner ends flush and the outer ends flush with each other. A simple tubular mouthpiece is provided with a radial lug on one side which is pivotally bolted and spring-biased in place permitting the mouthpiece to be switched from one barrel or passage to another as desired.

The invention also features annular recesses formed in the inner ends in alignment with the respective passages and which recesses define keying seats or grooves. To the ends desired the mouthpiece has a cooperable endless flange which fits telescopingly into the groove in a manner to thus align the mouthpiece with the intended passage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in side elevation of a three-barrel caller constructed in accordance with the principles of the invention and showing the mouthpiece appropriately lined up with a selected one of the barrels or passages.

FIG. 2 is a top plan view of the caller shown in FIG. 1.

FIG. 3 is a view taken on the plane of the section line 3—3 of FIG. 2.

And FIG. 4 is a top plan view similar to FIG. 2 showing a modification, that is, wherein but two barrels are used.

Referring first to FIGS. 1 to 3, the aforementioned one-piece or equivalent body is denoted by the numeral 6 and comprises three circumferentially spaced equidistant component parts which are identified as side-by-side barrels and whose adjacent lengthwise side portions are joined by an intervening web or hub portion denoted generally at 8 in FIG. 2. All of the barrels are basically the same and each barrel defines an open-ended passage or, alternatively, an air column as at 10 in FIG. 3. The inner open ends of the respective barrels or passages are denoted at 12 and the outer ends at 14, the respective outer ends being in a common plane or flush with each other. The same is true of the inner ends 12 except that the inner end of each passage is provided with a recess as at 16 which is circular or annular and defines a keying groove for telescopic and cooperative reception of the insertable and removable annular flange 18 on the adjustable selectively usable mouthpiece 20. The mouthpiece proper is denoted at 22 and comprises a simple open-ended tube which the user aligns with his mouth in a now well-known manner. The flange is fitted when in use in the groove in the manner shown in full lines in FIG. 3. The mouthpiece or tube is provided on one side with a radial or lateral mounting lug 24 which has a surface 26 (FIG. 3) in movable contact with the end portions of the barrels. The means for adjustably mounting the lug comprises a screw-threaded headed fastener, more particularly a screw having a screw-threaded end 28 screwed into the lug 24 (FIG. 3) and having a portion passing through a bore 30 in the hub portion. It also has a smooth shank portion 32 which constitutes a journal and which turns in the bore or bearing 30. There is a headed end portion 34 which is fitted into a counterbore which provides a clearance socket as at 36 and which is formed in the aforementioned hub portion 8. A coiled spring 38 is provided and surrounds the headed shank portion and bears at one end against the head 34 and at its other end against the bottom of the socket 36.

The open outer end portion of each bore or passage serves to accommodate a more or less conventional type insertable and removable reed-equipped sounding device 40. The body portion of the sounding device is telescopingly and frictionally fitted and retained in place as denoted at 42 in FIG. 3. It is within the purview of the invention to employ different and distinguishable sounding devices depending on the nature of the call which is to be produced. Thus several or more such devices are capable of being used in the individual barrels. In addition, the mouthpiece can be lifted from the full line position to the dotted line position shown in FIG. 3 and can then be adjusted on the pivot pin so that it can be lined up with a selected one of the barrels.

It is within the purview of the invention to employ insertable and removable sounding devices or to permanently mount them in keeping with the requirements of hunters and others who use bird and animal callers.

In the simplified form shown in FIG. 4 the mouthpiece is denoted at 44 and comprises a tube 46 having a lug 48 pivotally mounted at 50 on the web 52 between the barrels one of which is denoted at 54 in FIG. 4. Hereagain, the inner end of the barrel is provided with a recess as at 56 to receive the flange (not detailed) in the same manner as illustrated in FIG. 3. The body in this instance is denoted generally by the numeral 58.

What is claimed as new is as follows:

1. A multipurpose fowl caller comprising: a portable body designed and adapted to be grasped and held in one hand of the user and embodying a plurality of separate passages open at their respective inner and outer ends, each passage providing an individual air column, an air responsive reed-equipped differently pitched sound generating and emitting device, air responsive sounding device operatively mounted in each passage, a single selectively usable rotatable mouthpiece cooperatively alignable with an inner end of a selected passage in a manner to direct a flowing column of air to and for operating the sounding device in said passage, and means operatively and adjustably mounting said mouthpiece on a cooperating inner end portion of said body.

2. The caller defined in and according to claim 1, and wherein said means comprises a lug carried by said mouthpiece, said lug abutting and having movable engagement with a surface of said inner end, and means pivotally mounting said lug on said body.

3. The caller defined in and according to claim 1, and wherein said means comprises a lug carried by said mouthpiece, said lug abutting and having movable engagement with a surface of said inner end, and means pivotally mounting said lug on said body, said inner end having an endless annular recess in alignment with each passage, said recess defining a keying groove, that end of said mouthpiece which is alignable with a selected passage having a projecting annular flange providing a mouthpiece positioning and keying member which can be seated and temporarily retained in said groove.

4. The caller defined in claim 2, and wherein the means pivotally mounting said lug comprises a pivot pin fixed to and projecting at right angles from said lug, a portion of said body proximal to said lug having a bore providing a bearing, a portion of said pin having a journal and said journal being mounted for rotation in said bearing.

5. The caller defined in claim 2, and wherein the means pivotally mounting said lug comprises a pivot pin fixed to and projecting at right angles from said lug, a portion of said body proximal to said lug having a bore providing a bearing, a portion of said pin having a journal and said journal being mounted for rotation in said bearing, said pin comprising a screw-threaded headed fastener, the threaded end being screwed into and anchored in said lug, the headed end projecting into a clearance socket provided therefor in said body, and a coil spring surrounding a shank portion of the pin with one end bearing against the headed end and the other end bearing against a surface of said body.

6. A multipurpose caller for fowl, birds, animals and the like comprising: a body capable of being conveniently and usably held in one hand, said body embodying at least two hollow companion barrels joined by an intervening hub-like web portion in spaced parallel relationship, said body having inner and outer ends, the hollow bores of said barrels providing open-ended individual passages, said hub portion having an axial bore and an aligned counterbore, said bore providing a bearing and said counterbore providing a coacting socket and said socket opening through the outer end of said web portion, the outer end portions of said passages containing air responsive reed-equipped differently pitched sound generating and emitting devices, a single rotatable mouthpiece selectively and communicably registrable with said passages, said mouthpiece provided with a lateral integral lug having shiftable engagement with a cooperable inner end of said body, and means operatively and adjustably and pivotally joining said mouthpiece and lug to said body.

7. The caller defined in claim 6, and wherein the means pivotally mounting said lug comprises a pivot pin fixed to and projecting at right angles from said lug, a portion of said body proximal to said lug having a bore providing a bearing, a portion of said pin having a journal and said journal mounted for rotation said bearing.

8. The caller defined in and according to claim 6 and wherein the means which serves to pivotally mount said lug comprises a pivot pin fixed to and projecting at right angles from said lug, a cooperating median hub portion of said body proximal to said lug having a bore providing a bearing and also a counterbore providing a socket in alignment with the bearing, a shank portion of said pin constituting a journal and being journalled for rotation in said bearing, said pivot pin having a headed end portion located in said socket, and a coil spring surrounding the shank portion of the pin with one end bearing against the headed end of the pin and the other end bearing against a surface of said hub portion.

9. The structure defined in and according to claim 8, and wherein the inner end portion of each barrel is provided with an endless annular recess, said recess defining a flange seating and temporary retaining groove, that end of the mouthpiece which is alignable with said groove having a projecting annular flange and said flange being adapted to be telescopingly seated and temporarily retained in said groove.

References Cited

UNITED STATES PATENTS

| 2,556,388 | 6/1951 | Bicocchi | 46—180 |
| 3,054,216 | 9/1962 | Testo | 46—177 X |
| 3,066,443 | 12/1962 | Mobley | 46—177 |

LOUIS G. MANCENE, Primary Examiner

ROBERT F. CUTTING, Assistant Examiner

U.S. Cl. X.R.

46—180